United States Patent
Bradley et al.

(10) Patent No.: US 8,468,394 B2
(45) Date of Patent: Jun. 18, 2013

(54) METHOD OF TRACING SELECTED ACTIVITIES WITHIN A DATA PROCESSING SYSTEM BY TAGGING SELECTED ITEMS AND TRACING THE TAGGED ITEMS

(75) Inventors: Daryl Wayne Bradley, Cambridgeshire (GB); John Michael Horley, Cambridge (GB); Sheldon James Woodhouse, Lincolnshire (GB)

(73) Assignee: ARM Limited, Cambridge (GB)

( * ) Notice: Subject to any disclaimer, the term of this patent is extended or adjusted under 35 U.S.C. 154(b) by 304 days.

(21) Appl. No.: 12/224,874

(22) PCT Filed: Mar. 9, 2006

(86) PCT No.: PCT/GB2006/000831
§ 371 (c)(1),
(2), (4) Date: Nov. 3, 2008

(87) PCT Pub. No.: WO2007/101972
PCT Pub. Date: Sep. 13, 2007

(65) Prior Publication Data
US 2009/0177928 A1    Jul. 9, 2009

(30) Foreign Application Priority Data
Mar. 9, 2006    (WO) .............. PCT/GB2006/000831

(51) Int. Cl.
*G06F 11/00* (2006.01)
*G06F 11/34* (2006.01)

(52) U.S. Cl.
USPC .............. 714/45; 714/27; 714/30; 714/35; 702/186; 709/224; 710/18

(58) Field of Classification Search
USPC ....... 714/27, 30, 32, 35, 45; 709/224; 710/18; 702/186, 187
See application file for complete search history.

(56) References Cited

U.S. PATENT DOCUMENTS 6,083,281 A * 7/2000 Diec et al. ............... 717/128
6,345,295 B1 * 2/2002 Beardsley et al. ......... 709/224

(Continued)

FOREIGN PATENT DOCUMENTS

EP    1 130 518    9/2001
JP    9-16439    1/1997

(Continued)

OTHER PUBLICATIONS

Widipedia's Memory management unit version from Jan. 25, 2006 http://en.wikipedia.org/w/index.php?title=Memory_management_unit&oldid=36674704.*

(Continued)

*Primary Examiner* — Joseph Schell
(74) *Attorney, Agent, or Firm* — Nixon & Vanderhye P.C.

(57) ABSTRACT

A data processing apparatus is disclosed, said data processing apparatus comprising a plurality of devices, trace logic associated with at least one of said plurality of devices, and tagging logic associated with at least one of said plurality of devices, said tagging logic being operable to: select at least one item, said at least one item comprising an activity to be monitored; provide said at least one selected item with tag data identifying said at least one item as an item to be monitored; and said trace logic being operable to: detect tagged items processed by said at least one device; and output trace information relating to at least some of said detected tagged items.

6 Claims, 6 Drawing Sheets

U.S. PATENT DOCUMENTS

| | | | |
|---|---|---|---|
| 6,415,378 B1* | 7/2002 | Davidson et al. | 712/207 |
| 7,107,489 B2* | 9/2006 | Gergen et al. | 714/30 |
| 7,937,683 B1* | 5/2011 | Herbst | 716/138 |
| 8,041,804 B2* | 10/2011 | Ottamalika et al. | 709/224 |
| 2004/0210804 A1 | 10/2004 | Kimelman et al. | |
| 2005/0160306 A1* | 7/2005 | Okunseinde et al. | 714/3 |
| 2005/0223283 A1* | 10/2005 | Frey et al. | 714/20 |
| 2005/0276386 A1* | 12/2005 | Ethier et al. | 379/32.05 |
| 2007/0225943 A1* | 9/2007 | Marano | 702/186 |

FOREIGN PATENT DOCUMENTS

| | | |
|---|---|---|
| JP | 10-40224 | 2/1998 |
| JP | 2000-148533 | 5/2000 |
| JP | 2002-236596 | 8/2002 |
| WO | 2004/042579 | 5/2004 |

OTHER PUBLICATIONS

Wikipedia's Direct memory access version Feb. 9, 2006 http://en.wikipedia.org/w/index.php?title=Direct_memory_access&oldid=38904435.*

Wikipedia's Universal asynchronous receiver/transmitter version from Feb. 24, 2006 http://en.wikipeida.org/w/index.php?title=Universal_asynchronous_receiver/transmitter&oldid=40949905.*

International Search Report for PCT/GB2006/000831, mailed Dec. 20, 2006.

Written Opinion of the International Searching Authority for PCT/GB2006/000831, mailed Dec. 20, 2006.

List of Cited References mailed Jul. 29, 2011 in corresponding Japanese application, (except pp. 2 and 3 of EP 1130518).

* cited by examiner

METHOD OF TRACING SELECTED ACTIVITIES WITHIN A DATA PROCESSING SYSTEM BY TAGGING SELECTED ITEMS AND TRACING THE TAGGED ITEMS

This application is the U.S. national phase of International Application No. PCT/GB2006/000831, filed 9 Mar. 2006, the entire contents of each of which are hereby incorporated by reference.

BACKGROUND OF THE INVENTION

1. Field of the Invention

The field of the invention relates to data processing and in particular to diagnostic mechanisms for monitoring data processing operations.

2. Description of the Prior Art

There are a number of situations where it is desirable to keep track of the processing being performed by a data processor. For example, such information is useful during the development of data processing systems, where it is often desirable to track the activity of the processing circuit. An example of tracing infrastructure that may be used to assist in such a process is a tracing tool.

Tracing the activity of a data processing system whereby a trace stream is generated including data representing the step-by-step activity within the system is a highly useful tool in system and software development. Such tracing tools use a variety of means for tracing the program flow including Embedded Trace Macrocells (ETM™) which are present on the chip whose processing is being monitored.

As the complexity of new devices increases, the support infrastructure and tools also need to increase in complexity. Existing trace sources (such as ETMs) support a large range of programming and configuration capabilities that when used effectively, allow the generation of trace data to be accurately controlled and managed and also the capture of this data to be limited to regions of interest. This helps avoid the generation of far too much trace data which it would be both difficult to download from the data processing apparatus and difficult to analyse.

With the development of trace infrastructure to extend beyond a single CPU to multiple components, the complexity and configuration required by the user increases even further. Understanding the flow of information around a chip requires each trace source to be configured with an awareness of how other trace sources are related. Furthermore, before tracing can be initiated multiple trace sources may need to be configured.

Figure 1:
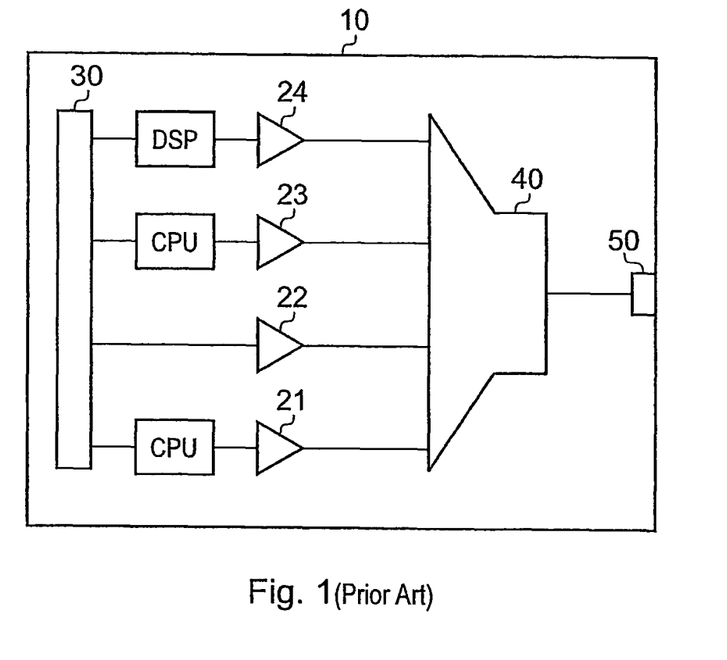
FIG. 1 shows a chip that comprises devices and trace sources according to the prior art.

FIG. 1 shows a chip 10 according to the prior art comprising a number of trace sources 21, 22, 23, 24 each operable to trace the operation of a different device on the chip. Thus, there is DSP trace hardware 24 to trace the activity of a digital signal processor two ETMS 21, 23 to trace two different CPU's and a bus trace macrocell 22 to monitor the activity of Bus 30. Thus, four different streams of trace data are generated. These are combined in a Funnel 40 and are then output via output Port 50.

In such a system, not only are four different streams of trace data produced but also four different trace sources need to be configured. If specific detailed trace knowledge is required, such as both address and data values, complex configuration and detailed knowledge of the complex SoC infrastructure is needed in order to tightly control the trace region in order to limit the amount of data produced to enable bandwidth restrictions on trace ports, such as Trace Port 50, to be met.

The present invention seeks to address some of the above problems.

SUMMARY OF THE INVENTION

According to a first aspect of the present invention there is provided a data processing apparatus, said data processing apparatus comprising a plurality of devices, trace logic associated with at least one of said plurality of devices, and tagging logic associated with at least one of said plurality of devices, said tagging logic being operable to: select at least one item, said at least one item comprising an activity to be monitored; provide said at least one selected item with tag data identifying said at least one item as an item to be monitored; and said trace logic being operable to: detect tagged items processed by said at least one device associated with said trace logic; and output trace information relating to at least some of said detected tagged items.

The present invention differs from conventional traces, by allowing the selection and then tagging of an item comprising a particular activity that is to be monitored. This activity could be related to a data item, or to an instruction or it could be an event such as a cross trigger. The tagging of the item allows possible other trace logic to detect the activity and output trace information relating to any detected tagged items. This is a different way of tracing and enables the behaviour of the data processing apparatus in response to a particular activity to be monitored. Not only does this target the trace to the monitoring of the selected activity and thereby reduce trace data to that which is relevant, but it also makes the configuration of the devices far simpler. In particular, configuration merely requires the configuration of the tagging logic to tag a particular item, whereupon the data processing apparatus can run and the devices and trace logic can react automatically to the tagged items. It should be noted that when we refer to items being processed by different devices, this includes items being transmitted by, for example, a bus. Furthermore, the tagging of an item involves associating with the item an indicator that that item is to be monitored. This can clearly be done in a number of ways, some of which are outlined below.

Advantageously, at least some of said plurality of devices are operable in response to receipt of a tagged item, to tag any items generated from processing of said received tagged item.

The behaviour of the data processing apparatus in response to the tagged item can be monitored effectively if at least some of the devices automatically tag any items generated from processing of the received tagged items. Thus, the behaviour flow of the processing apparatus can be monitored automatically as tagged items are produced by the devices processing other tagged items. This enables the behaviour of the apparatus in response to a tagged item to be monitored and avoids the need to separately configure individual trace logic associated with individual devices prior to starting the trace.

In some embodiments, said data processing apparatus comprises a plurality of trace sources each associated with a corresponding device, each of said plurality of trace sources operable to detect tagged items and to output trace information relating to at least some of said detected tagged items.

The data processing apparatus may comprise a single trace logic associated with one of the plurality of devices or it may comprise several associated with a subset of the devices or in fact, it may comprise trace logic associated with each of the devices. An advantage is that the individual configuration of these trace logics might not be required, as they automatically detect the tagged items and respond in accordance with the tag information. Only basic enable/disable trace might be required.

Tag data is simply information that is associated with an item that is selected. It can take a number of forms, for example it may be associated with said item as a sideband signal, or alternatively in other embodiments it may be transmitted on a separate communication channel.

In some embodiments, said tag data comprises a bit indicative of whether an associated item should be traced or not.

Although the tagged data can comprise a number of forms, in some embodiments it comprises a single bit which indicates whether the associated item should be traced or not This has the advantage of being simple to implement and not requiring much bandwidth to transmit the information.

In some embodiments, said tag data comprises security information of an associated item, said trace source being operable in response to said security information restricting output of trace information relating to said tagged item to impede tracing of said tagged item and in response to said security information permitting output of said trace information to allow tracing of said tagged item.

Embodiments of the present invention may trace secure systems. In such systems, the tag can be used to impede the output of information from the secure world and thereby in a simple yet effective way increase the security of the system and impede secure data being output as trace information to those not permitted to trace that particular secure data.

In some embodiments, said tag data comprises priority information indicating a priority level for monitoring an associated item, said trace source being operable in response to said priority information indicating said item to have a high priority to output trace information relating to said item and in response to said priority information indicating said item to have a low priority to not output trace information relating to said item.

The tagged data can also comprise priority information indicating the importance of monitoring the associated item. This can be used to stop the amount of data being traced proliferating and becoming too large. By using a tag that indicates how important it is that the associated item is traced, a selection can be made which enables only higher priority data to be traced in situations where the traced data is becoming too large to manage.

Advantageously, at least some of said plurality of devices are operable to alter said priority information of said tag associated with said item when processing said item to indicate a lower priority information and to tag any items they generate in response to processing said item with a tag indicating said lower priority level.

When a tagged item is processed, any item generated by this processing also becomes tagged. It can be that in some situations a tagged data item generates a large number of other items. This can quickly proliferate and end up in a huge amount of trace data. Thus, one way of addressing this problem would be to decrease the level of priority of a data item every time it is processed. Thus, as you move away from the item and point of primary interest the priority of the items being processed becomes lower and you can select a certain point where you are no longer interested in these items and they can thus not be traced.

In some embodiments, said tag data comprises a life span indication, wherein each time a tagged item is processed by a device, said life span indication is reduced, said tag being deleted when said life span has been reduced to a value indicating expiry of said life span.

A different way of controlling an amount of trace data is to use a life span indicator as your tag data. Each time the tagged item is processed the life span indicator is reduced and this can be set so that after being processed a certain number of times the life span has expired and that item is no longer of interest to a trace.

In some embodiments, said at least one of said plurality of devices comprises a counter, said at least one of said plurality of devices being operable to provide a current counter value as said tag data, said trace source being operable when outputting trace information associated with said item to output said tag data indicating said counter value at a point of tagging of said data item, and to output a counter value of said counter at a point of receipt of said tagged item at said at least one of said plurality of devices following processing by at least one other of said plurality of devices.

Embodiments of this device can be used to monitor performance of a data processing apparatus. This can be done by providing a counter on one of the devices and using the counter value as the tag value. Thus, the amount of time between that data item being tagged and it being interpreted by a device can be monitored if the tag data is set to be the counter value at the time of tagging. This can be a very effective way of monitoring the performance of a data processing apparatus.

In some embodiments, said tag data comprises information indicating an expected destination device, at least some of said plurality of devices being operable to detect said tag when processing said item and if said tag does not indicate them as said expected destination device to amend said tag data to indicate said item is to be monitored.

Using an expected destination device indicator as the tag data can enable devices that receive this data to detect from the tagged data if they should not have received it. If this is the case, they amend the tag data to indicate that this item should therefore be monitored. In conventional tracing systems it can be difficult to trace where a problem occurs, if an item is in fact sent to an incorrect destination. If it is known that a problem occurs, then the destination where this item is expected is traced, but as each device is separately traced by a separate trace source or logic, it may be that the actual destination of the item is not easily located. In this embodiment, use of tag data enables the arrival at an incorrect destination to be easily identified. This is an effective way of producing extremely relevant trace data and avoids or at least reduces the production of a large amount of trace data that is not relevant.

In some embodiments, said tag data comprises information either indicating that all subsequent items should be monitored or indicating that monitoring of items should stop, said trace logic being operable in response to said tag data to start and stop tracing of activities of said at least one device.

Tag data can simply comprise information that monitoring of trace information should start and that it should stop. Thus, trace can be turned off and on in response to receipt of particular tag data of this form.

Advantageously, the tagging logic comprises tagging resources operable to store information concerning said item to be selected for monitoring, said tagging resources being programmable.

A particular item or items to be monitored are defined by a user and programmed into a device. This is done by providing at least some of the devices with tagging logic that includes tagging resources. These can store information input by a user which indicates which item is to be selected and therefore tagged for monitoring.

In some embodiments, said tagging resources comprise at least one of an address comparator, a data value comparator, a register for storing an address, a register for storing a data value and event monitoring logic for monitoring the occurrence of an event such as an exception, interruption or performance monitoring logic event.

Use of address comparators, data value comparators and registers for storing the required addresses and data values allow a user to input data values or instruction addresses required to identify the items of interest. The device can then compare the stored values with actual items that are being processed and when it detects a match it can tag the item. Additionally or alternatively, event monitoring logic can be used to detect an event and to tag an item in response to the detected event. The event may be an interrupt or exception or it may be some event associated with the performance of the processor.

Preferably, the data processing apparatus comprises at least one bus connecting at least two of said plurality of devices, said at least one bus comprising at least one wire dedicated to transmitting tag data.

One way of transmitting the tag data is to provide each bus with at least one additional wire dedicated to transmitting tag data. Generally there will be two wires, one for transmitting the tag data in one direction and the other for transmitting it in the other direction. These wires can trait tagged data as a single bit in the embodiments where this is the case, or in other embodiments where the tag data is a plurality of bits then it can be transmitted as a serial plurality of bits transmitted according to a particular protocol.

In some embodiments, said trace source is operable to perform operations in response to said tagged data, said operations comprising performing a number of steps specified by said tagged data prior to collecting and outputting trace information.

Although the trace source may be operable to output trace information in response to some tag data, in response to other tag data it may perform other operations, such as monitoring a device and waiting for it to perform a plurality of steps prior to outputting trace information.

A further aspect of the present invention provides a method of monitoring behaviour of a data processing apparatus in response to an activity, said data processing apparatus comprising a plurality of devices and trace logic associated with at least one of said plurality of devices, said method comprising the steps of: selecting at least one item, comprising an activity to be monitored; providing said at least one selected item with tag data identifying said at least one item as an item to be monitored; detecting tagged items processed by said at least one device; and outputting trace information relating to at least some of said detected tagged items.

A still further aspect of the present invention provides a computer program product which is operable when run on a data processor to control the data processor to perform the steps of the method according to the further aspect of the present invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 2:
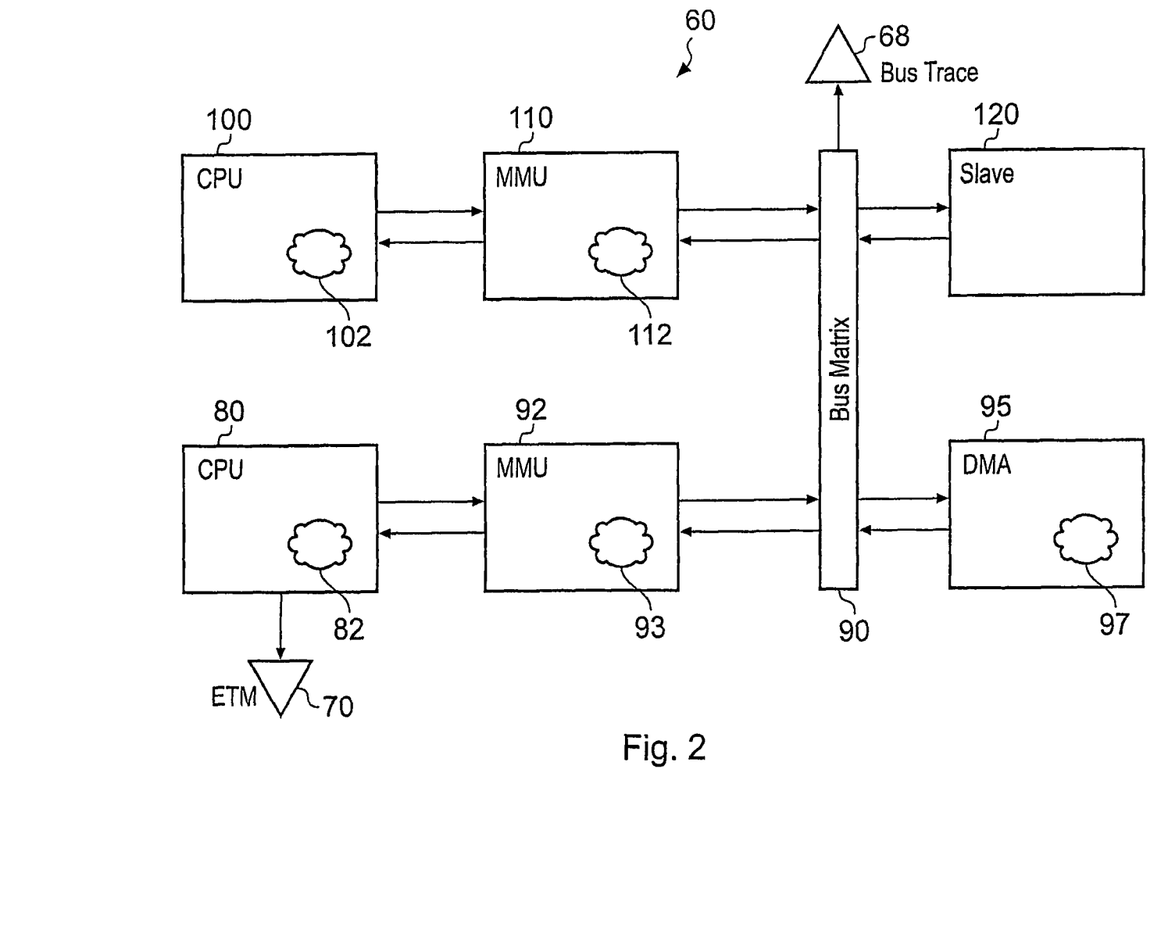
FIG. 2 shows a data processing apparatus according to an embodiment of the present invention.

FIG. 2 shows a data processing apparatus 60 according to an embodiment of the present invention. Data processing apparatus 60 comprises two trace logic blocks or trace sources 68, 70. These comprise ETM, 70 which is arranged to trace CPU 80 and Bus Trace Macrocell 68 which is arranged to trace Bus Matrix 90. This data processing apparatus 60 further comprises a second CPU 100, Memory Management Units (MMU) 110, 92, a Direct Memory Access Controller (DMA) 95, and a slave device 120. Both CPU's 80 and 100, MMU's 92 and 110, and DMA 95 comprise tagging logic 82, 102, 93, 112, 97 respectively. These tagging logic blocks 82, 102, 93, 112, 97 are programmable and are used by a user of the device to configure the apparatus to perform a particular trace. The user does this by selecting a particular activity to be monitored and then storing an indication of this activity in the tagging logic blocks. This may be in the form of an instruction address, or it may be a data value. Tagging Logic 82 is shown in greater detail in FIG. 3 which will be described later.

Tracing logic 82, 102, 93, 112, 97 within the respective devices can be configured by a user to select a data item to be tagged. Although these are the only devices that can be configured in this way, all of the devices on the data processing apparatus 60, including slave device 120 are operable to tag data in some way. That is to say, all of the devices will tag any items that they generate in response to processing a received tagged item. This may mean the generation and tagging of a single item generated by processing of the tagged item or it may mean the tagging of a large number of items generated by processing of the tagged item.

In the apparatus of FIG. 2 tracing logic is associated with only two of the devices, that is CPU 80 and Matrix 90. Thus, tagged data being processed by these devices can be detected by tracing logic 70 and 68 respectively and depending on the nature of the tag, detection of this tag data may initiate the output of trace data. It may not initiate this, but may rather initiate a different event within the tracing logic such as the performance of a plurality of steps prior to outputting trace data or it may simply not output trace data in response to a particular tag. This depends on the nature of the tag data, which may just be simple data indicating the item is to be traced and output, or it may contain further control information.

Figure 3:
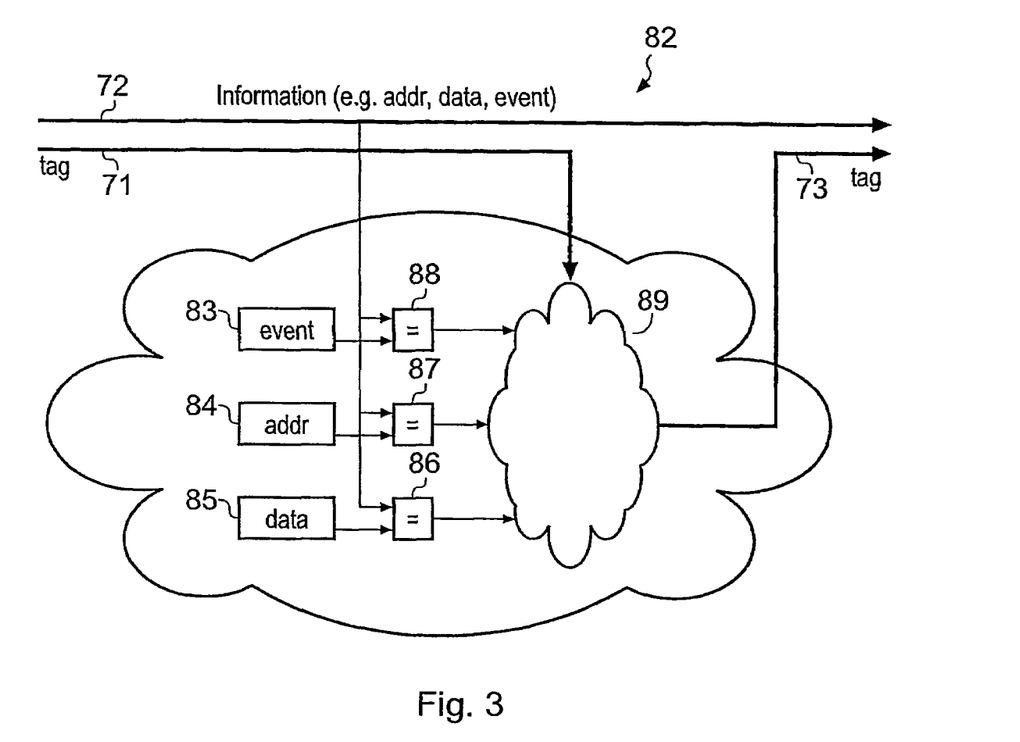
FIG. 3 shows tagging logic according to an embodiment of the present invention.

FIG. 3 shows Tagging Logic 82 in greater detail. Tagging Logic 82 comprises registers 83, 84 and 85. Register 83 is operable to store the presence of an event. Register 84 is operable to store an instruction address input by a user while register 85 is operable to store a data value input by user. Comparators 86, 87, and 88 are operable to compare values and addresses of instructions and data being processed, and events occurring within CPU 80 and in the event of the comparator showing the values to be equal then the item being processed is tagged by logic 89 such that the incoming tag 71 is modified to form tag 73 and maintains association with information 72. Incoming tag 71 is optional in that the item may not yet be tagged and logic 89 may be the first instance at which tagging information is supplied to produce tag 73. Tagging of this single item initiates zero or more events in all devices that process this tagged item and results in the behaviour of the data processing apparatus in response to this item being able to be traced. This is because all of the devices are operable to detect and respond to the tagged data. The response may also be just to pass the information through with no change.

Figure 4:
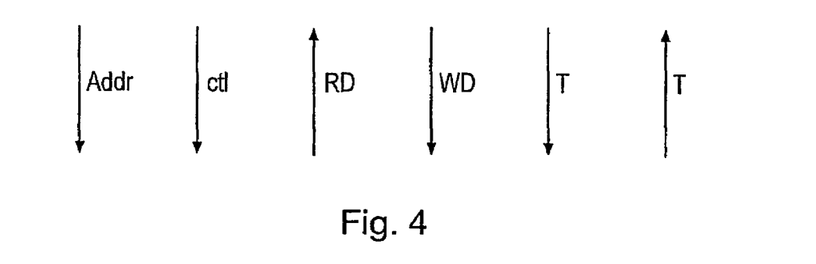
FIG. 4 schematically shows the channels of a bus according to an embodiment of the present invention.

FIG. 4 shows in a simplified representation a bus according to an embodiment of the present invention. This bus comprises an address channel operable to transmit an address, a control channel operable to transmit control data, a read data channel operable to transmit read data, a write data channel operable to transmit write data and two tag data channels operable to transmit and receive tag data. Thus, in this embodiment additional tag channels are provided on the bus to enable tag data associated with certain items to be transmitted around the data processing apparatus.

Figure 5:
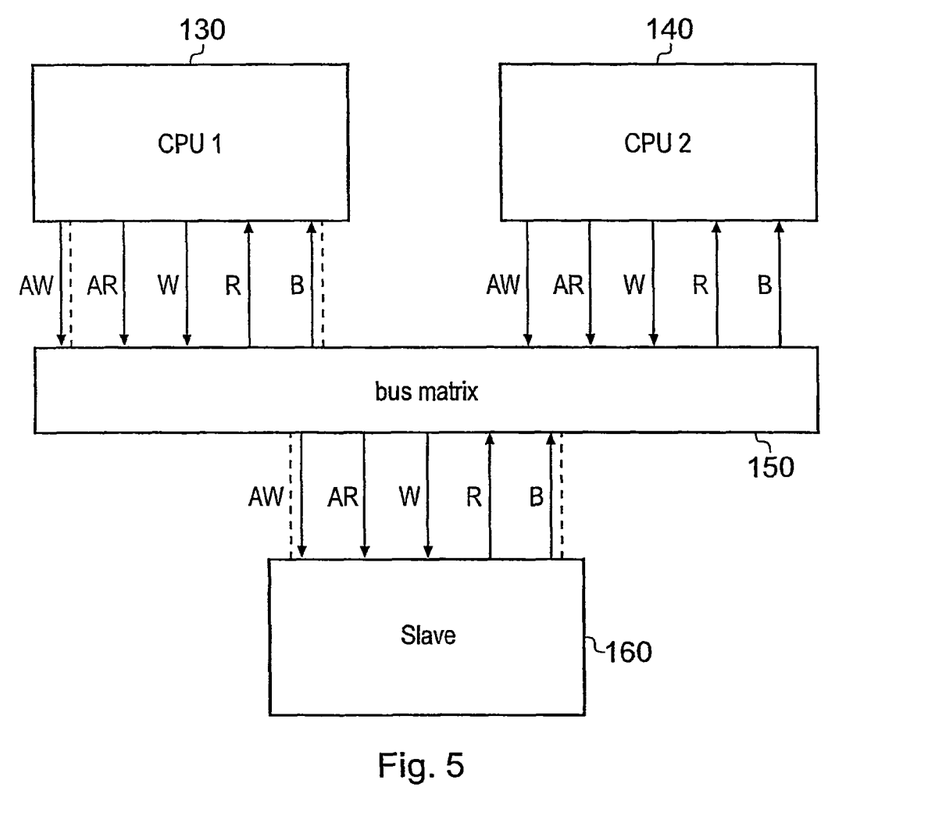
FIG. 5 shows a data processing apparatus comprising devices linked by AXI buses.

FIG. 5 shows a further embodiment of the present invention in which AXI buses are used to connect two CPU's 130, 140 respectively, and Bus Matrix 150. A further AXI bus is used to connect Slave 160 to Bus Matrix 150. Tracing of AXI busses may prove to be problematic using traditional techniques due to the out of order nature of transactions. Embodiments of the present invention address many of the problems associated with tracing the activity of AXI buses.

In particular, an AXI bus comprises address write control channel AW, and an address read control channel, AR, a write data channel W, a read data channel R, and a B channel, which is a control channel that indicates that a write is completed as required. Channels on the AXI bus operate independently and it can be difficult to collate the write data being sent down a particular channel to the control data associated with it when tracing. The use of tags and the tagging of any item generated by a tagged item, makes it easy to know which items on AW, W and B are associated with each other.

Figure 6A:
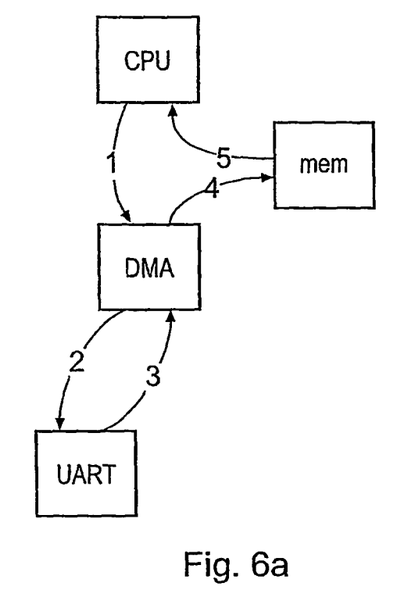
FIG. 6A schematically shows transactions between devices.
Figure 6B:
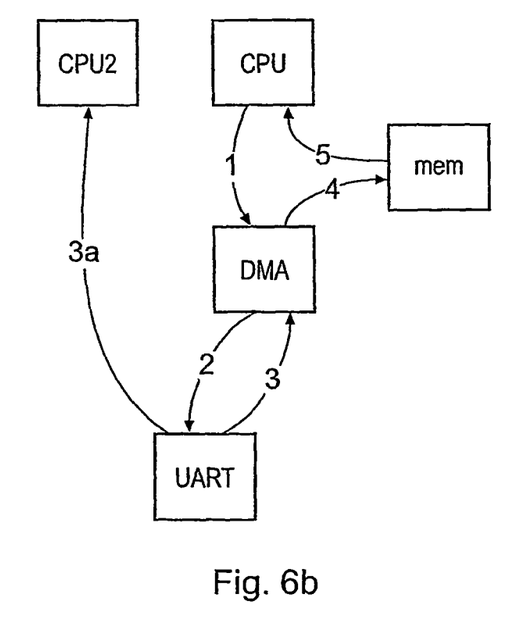
FIG. 6B schematically shows the same transactions with an additional transaction occurring between two of the transactions shown in FIG. 6A.

FIG. 6A and FIG. 6B show a detailed scenario of an embodiment of the present invention. In this embodiment arrow 1 represents CPU programming DMA controller to transfer data from UART to memory. Arrow 2 represents DMA controller accessing UART. Arrow 3 represents the UART returning data to DMA controller, arrow 4 represents a DMA controller storing data to memory and arrow 5 represents a CPU read memory.

Using schemes covered by embodiments of this invention, transactions initiated by the CPU (when executing the UART code) to the DMA will be tagged. Then any subsequent transactions by the DMA are tagged. The UART receives these tagged transfers, and tags any data which is returned. This data is tracked back to the DMA, then subsequently the memory and finally back to the CPU. This results in the data flow shown in FIG. 6A.

FIG. 6B shows a problem occurring in the data flow of the system of FIG. 6A. In this instance when reading the memory the CPU discovers some corrupted UART data. This is caused by a second CPU accessing the UART (universal asynchronous receiver transmitter) while the DMA (direct memory access controller) is transferring data from the UART, crucially between stages 2 and 3 of the above diagram. Embodiments of this invention can be used to track this process and highlight accesses to the UART whilst it is being accessed by the DMA, initiating trace on a second CPU as stage 3A. Under conventional trace schemes, the user might not have programmed trace on CPU 2 since they were only interested in what happened in the first CPU and were not aware that CPU 2 could have an affect on the UART. Embodiments of this invention can be used to initiate trace generation only when the event of interest occurs i.e. when tagged data is received by the CPU. Thus, CPU2 when accessing the UART will receive tagged data and will thus, output trace information about this transaction. Conventional trace solutions could be programmed to continually trace the whole system, which may not be feasible if the system bandwidth is limited. Thus, FIG. 6A and FIG. 6B show a problem occurring in a system where trace according to an embodiment of the present invention is particularly advantageous.

Figure 7:
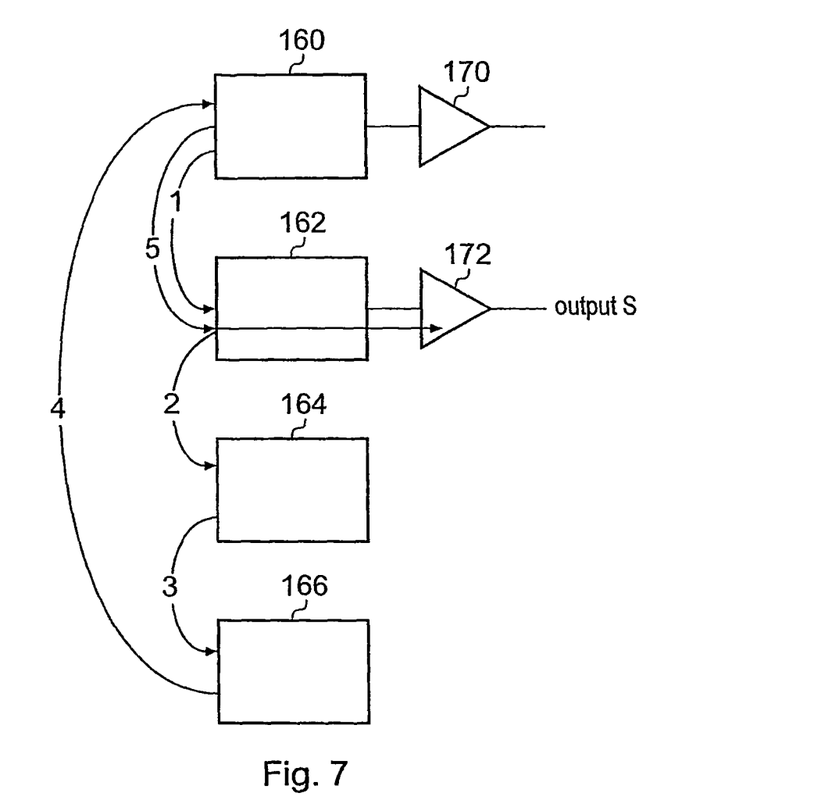
FIG. 7 schematically shows transactions between devices and the trace of a selected transaction.

FIG. 7 shows a further example of a system being traced. In this system devices 160 and 162 have trace logic blocks or trace sources 170, 172 associated with them. Item 1 is tagged and passes from 160 to 162. However, the tag does not indicate that it is itself to be traced, thus no trace data is output. Further tagged activities pass from block to block until arrow 5 indicates a tagged item being received at processor 162. The tag on this item indicates it should be traced and trace data is output by trace logic 172.

This figure shows that tag data may contain more information than simply that the tagged item should be traced. Examples of control data the tag may contain is information telling a trace source to start or stop tracing from that point, or information indicating how important it is to trace it, and depending on the priority level setting of the trace source may be traced or may not be. It may also contain security data impeding its trace if it's an item from the secure world.

In some embodiments, there may be processes, where it is known which devices should be accessed, for example in the case of exclusive loads and stores. Thus, in some embodiments this information is included in the tag data. In such a case, when a device that is not a device specified by the tag data is accessed by an item having this tag, the device amends the tag to say that the tagged item should be traced.

In still other embodiments, the tagging logic may comprise a counter. A value of the counter at the point of tagging may be included in the tag. Then when any item that has a tag having this counter value is received back at the device having this tagging logic, the time that it has taken between the tag being set and this resultant item arriving can be calculated from the tagged counter value and the counter value on receipt of this item. This can be a very useful tool that can be used to assess the performance of the data processing apparatus.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A data processing apparatus, said data processing apparatus comprising:
   a plurality of devices, said plurality of devices comprising:
      at least one processing unit; and
      at least one further unit, said at least one further unit comprising:
         a memory management unit;
         a direct memory access unit;
         a bus matrix;
         a universal asynchronous receiver transmitter (UART) or a slave device;
   and
   trace circuitry and tagging circuitry, each of said trace circuitry and said tagging circuitry associated with at least one of said plurality of devices, said tagging circuitry configured to:

select at least one item, said at least one item comprising an activity to be monitored; and provide said at least one selected item with tag data identifying said at least one item as an item to be monitored; and said trace circuitry configured to:

detect tagged items processed by one of the plurality of devices associated with said trace circuitry other than said at least one of said plurality of devices associated with said tagging circuitry that identified said at least one selected item; and output trace information relating to at least some of said detected tagged items, a plurality of trace sources each associated with a corresponding device, each of said plurality of trace sources operable to detect tagged items and to output trace information relating to at least some of said detected tagged items, wherein said tag data comprises security information of an associated item, said trace source being operable in response to said security information restricting output of trace information to impede output trace information relating to said tagged item and in response to said security information permitting output of said trace information to allow tracing of said trace information.

2. A data processing apparatus, said data processing apparatus comprising:

a plurality of devices, said plurality of devices comprising:
 at least one processing unit; and
 at least one further unit, said at least one further unit comprising:
  a memory management unit;
  a direct memory access unit;
  a bus matrix;
  a universal asynchronous receiver transmitter (UART) or a slave device;
 and trace circuitry and tagging circuitry, each of said trace circuitry and said tagging circuitry associated with at least one of said plurality of devices, said tagging circuitry configured to:

select at least one item, said at least one item comprising an activity to be monitored; and provide said at least one selected item with tag data identifying said at least one item as an item to be monitored; and said trace circuitry configured to:

detect tagged items processed by one of the plurality of devices associated with said trace circuitry other than said at least one of said plurality of devices associated with said tagging circuitry that identified said at least one selected item; and output trace information relating to at least some of said detected tagged items, a plurality of trace sources each associated with a corresponding device, each of said plurality of trace sources operable to detect tagged items and to output trace information relating to at least some of said detected tagged items, wherein said tag data comprises priority information indicating a priority level for monitoring an associated item, said trace source being operable in response to said priority information indicating said item has a high priority to output trace information relating to said item and in response to said priority information indicating said item has a low priority to not output trace information relating to said item.

3. A data processing apparatus according to claim 2, wherein at least some of said plurality of devices are operable to alter said priority information of said tag associated with said item when processing said item to indicate a lower priority and to tag any items they generate in response to processing said item with a tag indicating said lower priority level.

4. A data processing apparatus, said data processing apparatus comprising:

a plurality of devices, said plurality of devices comprising:
 at least one processing unit; and
 at least one further unit, said at least one further unit comprising:
  a memory management unit;
  a direct memory access unit;
  a bus matrix;
  a universal asynchronous receiver transmitter (UART) or a slave device;
 and trace circuitry and tagging circuitry, each of said trace circuitry and said tagging circuitry associated with at least one of said plurality of devices, said tagging circuitry configured to:

select at least one item, said at least one item comprising an activity to be monitored; and provide said at least one selected item with tag data identifying said at least one item as an item to be monitored; and said trace circuitry configured to:

detect tagged items processed by one of the plurality of devices associated with said trace circuitry other than said at least one of said plurality of devices associated with said tagging circuitry that identified said at least one selected item; and output trace information relating to at least some of said detected tagged items, wherein said at least one of said plurality of devices comprises a counter, said at least one of said plurality of devices being operable to provide a current counter value as said tag data, said trace circuitry configured, when outputting trace information associated with said item, to output said tag data indicating said counter value at a point of tagging of said data item, and to output a counter value of said counter at a point of receipt of said tagged item at said at least one of said plurality of devices following processing by at least one other of said plurality of devices.

5. A data processing apparatus, said data processing apparatus comprising:

a plurality of devices, said plurality of devices comprising:
 at least one processing unit; and
 at least one further unit, said at least one further unit comprising:
  a memory management unit;
  a direct memory access unit;
  a bus matrix;
  a universal asynchronous receiver transmitter (UART) or a slave device;
 and trace circuitry and tagging circuitry, each of said trace circuitry and said tagging circuitry associated with at least one of said plurality of devices, said tagging circuitry configured to:

select at least one item, said at least one item comprising an activity to be monitored; and provide said at least one selected item with tag data identifying said at least one item as an item to be monitored; and said trace circuitry configured to:

detect tagged items processed by one of the plurality of devices associated with said trace circuitry other than said at least one of said plurality of devices associated with said tagging circuitry that identified said at least one selected item; and output trace information relating to at least some of said detected tagged items, wherein said tag data comprises information indicating an expected destination device, at least some of said plurality of devices being operable to detect said tag data when processing said item and, if said tag data does not indicate said at least one processing device as said expected destination device, said at least one processing device is configured to amend said tag data to indicate said item is to be monitored.

6. A data processing apparatus, said data processing apparatus comprising:

a plurality of devices, said plurality of devices comprising:

at least one processing unit; and at least one further unit, said at least one further unit comprising:

a memory management unit;

a direct memory access unit;

a bus matrix;

a universal asynchronous receiver transmitter (UART) or a slave device;

and trace circuitry and tagging circuitry, each of said trace circuitry and said tagging circuitry associated with at least one of said plurality of devices, said tagging circuitry configured to:

select at least one item, said at least one item comprising an activity to be monitored; and provide said at least one selected item with tag data identifying said at least one item as an item to be monitored; and said trace circuitry configured to:

detect tagged items processed by one of the plurality of devices associated with said trace circuitry other than said at least one of said plurality of devices associated with said tagging circuitry that identified said at least one selected item; and output trace information relating to at least some of said detected tagged items, wherein said tag data comprises information either indicating that all subsequent items should be monitored or indicating that monitoring of items should stop, said trace circuitry is responsive to said tag data to start and stop tracing of activities of said at least one device.

\* \* \* \* \*